Sept. 19, 1972  R. L. SCHMIDT ET AL  3,692,620

LAMINATED GYPSUM BOARD

Filed Oct. 23, 1967

INVENTORS
HUBERT J. BECKMAN
ROBERT L. SCHMIDT
BY
CECIL C. SCHMIDT
THEIR ATTORNEY 3,692,620
LAMINATED GYPSUM BOARD
Robert L. Schmidt, St. Charles, Ill., and Hubert J. Beckman, Bloomington, Minn., assignors to Ashland Oil, Inc., Ashland, Ky.
Filed Oct. 23, 1967, Ser. No. 677,264
Int. Cl. B32b 13/12, 27/10
U.S. Cl. 161—88    5 Claims

ABSTRACT OF THE DISCLOSURE

Laminates are produced from gypsum board and resin-saturated paper by a low pressure, thermosetting process. The resulting laminated gypsum board is useful as a building material, for example, on or as part of a wall. These laminates can be made at a low cost with a variety of decorative surfaces and with physical properties similar to the expensive, high pressure laminates (e.g. melamine-aldehyde laminates).

BACKGROUND OF THE INVENTION

Lamination is a general term which denotes the building up of thin sheets or layers of one or more materials with the aid of a bonding material, usually a thermosetting resin, to form a thicker, heavier sheet or board having desirable properties. The decorative laminates on the market today can be divided into two general classes: (1) high-pressure laminates; and (2) low-pressure laminates.

High-pressure laminates can be prepared by coating or impregnating a suitable base material (e.g. paper) with a thermosetting resin (e.g. a phenolic resin). A sandwich is then made from one or more sheets of this impregnated base material, with or without a supporting substrate (e.g. hardboard). The sandwich is then pressed or laminated under high pressures (e.g. 800–1800 p.s.i.g.) and moderately high temperatures (240°–350° F.) to form a hard, dense board or molded form. Base materials include paper, absestos paper, woven and non-woven fabrics, (e.g. cotton fabric), fiber glass, and the like. The most popular resins are phenol-formaldehyde resins, melamine-formaldehyde resins, and urea-formaldehyde resins.

Although there is no sharp dividing line between "high-pressure" laminates and "low-pressure" laminates, the latter are commonly made at pressures below 500 p.s.i.g. Base materials similar to those used in making high-pressure laminates can be used. The resins employed can include the thermosetting resins (e.g. phenolics) capable of being heat converted at low pressures, and some thermoplastic resins.

High-pressure laminates have gained the greatest popularity and are widely used, largely because they generally possess properties far superior to those of the low-pressure laminates. One common high-pressure laminate is "Formica" (a registered trademark).

Although these high-pressure laminates are in wide commercial use, their method of manufacture imposes severe limitations on the method of fabrication of finished articles.

For example, high-pressure laminates formed directly on supporting substrates must be prepared using substrates having high compressive strengths (i.e., sufficient to withstand the laminating pressures). Suitable substrates include plywood and hardboard. Gypsum board has a low compressive strength and is not a suitable substrate. For these and other reasons, it is common for a series of resin-impregnated sheets (e.g. paper) to be laminated together by the high-pressure process to form a thicker, rigid material which is then bonded to a suitable substrate (e.g. wood) with an adhesive.

Additionally, rough or uneven substrates cannot be used during lamination at the high pressures because this roughness telegraphs through the resin-impregnated laminating fabrics or papers during lamination. This results in uneven or rough finished surfaces.

For these and other reasons known to those skilled in the laminating arts, the uses of high quality, decorative laminates prepared by high pressure processes have been confined to a considerable extent to specialized uses (e.g. in manufacturing furniture and counter tops).

SUMMARY OF THE INVENTION

We have now discovered that inexpensive, decorative and functional laminates, competitive in appearance and substantially cheaper to manufacture than common high-pressure laminates, can be prepared as low-pressure supported laminates from gypsum board and resin-impregnated paper or cloth. These laminates can be prepared directly from the resin-impregnated paper or cloth and gypsum board, thereby avoiding the costs of cutting and gluing conventional high-pressure unsupported laminates to supporting substrates. Furthermore, by selectively adjusting the various conditions of manufacture, the laminated gypsum boards of the present invention can be made with physical surface properties less than, equivalent to, and better than many conventional high-pressure laminates. For example, tests using the Tabor Abrasion Test specified by NEMA have shown preferred laminated gypsum boards of this invention (made with unsaturated polyester resins) to have an abrasion value in excess of 700 which surpasses conventional high pressure melamine-formaldehyde laminates which are rated substantially lower at 450. Further comparisons with these same conventional high-pressure laminates show the laminated gypsum boards of the present invention to have (1) better abrasion resistance and (2) better stain resistance. All of these properties can be obtained at a substantially reduced cost when compared to conventional high-pressure laminates.

The present invention can be further understood by reference to the attached drawing and the following description.

THE DRAWING

DETAILED DESCRIPTION OF THE INVENTION

Figure 1:
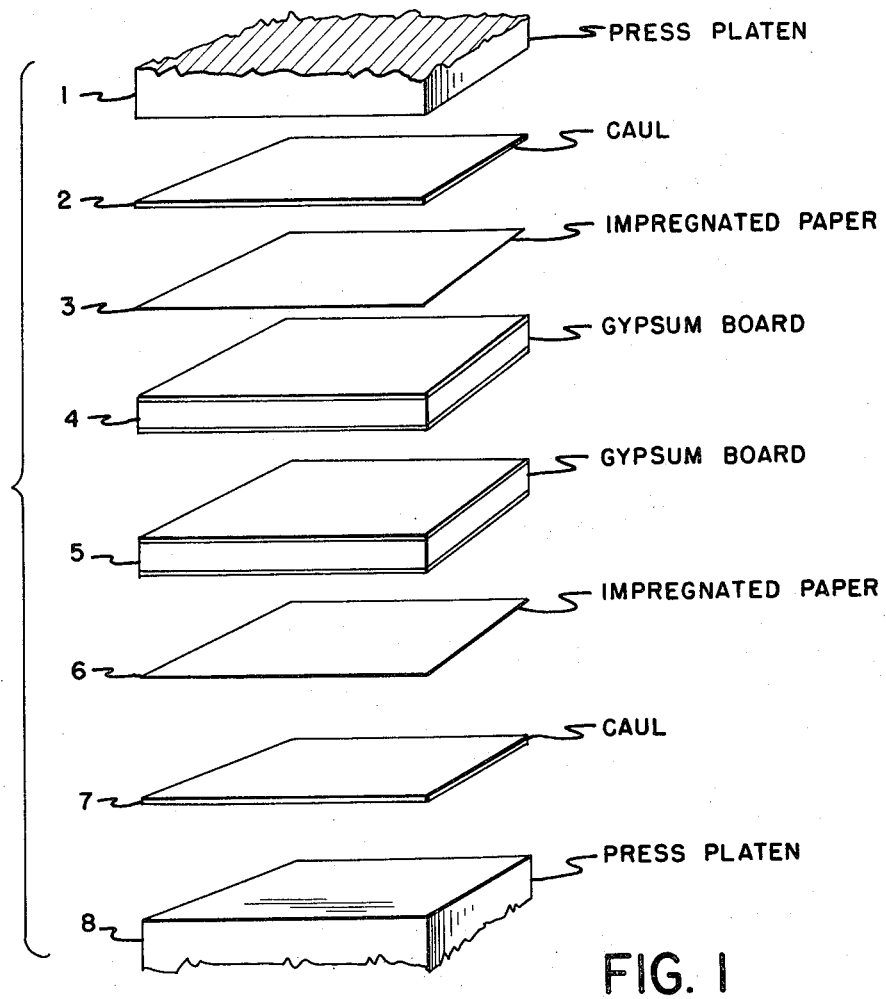
FIG. 1 is an exploded view of the laminating assembly (i.e., "sandwich") and press platens of a typical laminating operation of this invention.

The laminated gypsum boards of this invention can be prepared in low-pressure, hot-plate laminating presses. Such presses have one or more sets of paired platens 1 and 8. A wide variety of presses are marketed and multiple-tier presses can be used. In a typical two-laminate layup according to this invention, a sandwich or laminating assembly is prepared by stacking a caul plate 2, resin-impregnated paper 3, gypsum boards 4 and 5, resin-impregnated paper 6 and caul plate 7. This sandwich is then inserted between press platens 1 and 8. The press is then actuated to a pressure below that at which the gypsum board will crumble (i.e., without crushing the gypsum board). With gypsum board, the upper pressure limit is typically in the range of 600–800 p.s.i.g., although the precise pressure limit will vary depending upon the exact nature and quality of the gypsum board involved. Preferably, the laminating pressure will be between 50 and 300 p.s.i.g., usually 80–200 p.s.i.g. The temperature used can vary and will be determined by such factors as the resin, the curing catalyst, the desired cycle time, etc. Generally, a temperature of 200°–400° F. will be used. We have successfully used temperatures within the range of 275°–325° F. At temperatures of 280°–300° F. and pressures of 100–120 p.s.i.g., a cycle time in the press of 5–8 minutes is typical. At the end of the cycle time, the two laminated gypsum boards are then removed from the press while hot and immediately stacked for slow cooling.

The purpose of cauls 2 and 7 is to impart a desired surface finish to the resulting supported laminate (e.g. the composite of impregnated paper 3 and gypsum board 4) and to prevent the resin from adhering to the press platens. As those skilled in the laminating art already know, the flow of the resin which takes place during the laminating process causes the surface of the laminate to assume or duplicate the finish of the caul sheet. Aluminum cauls are recommended for best results. They give excellent release, are light in weight and are easily rubbed to a desired sheen. For low gloss effects, aluminum can be etched and anodized. Similarly, the cauls can be shaped to impart embossed surfaces or patterns to the laminate (e.g. a waffle-iron shaped caul can be used to impart a waffle-like appearance to the resulting laminate). New cauls should be washed with solvent (e.g. lacquer thinner) and treated with mold release agents such as stearic acid. Alternatively or additionally, mold release agents can be included in the resin impregnated paper. In addition to using the caul sheets to obtain various gloss and pattern effects, several types of release papers are on the market which can be inserted between the caul sheets and the impregnated paper during lamination. The use of release papers is especially useful in imparting a wood grain feel to the resulting laminates when simulating wood paneling.

Resin impregnated papers (3 and 6) are prepared by dipping or otherwise coating, impregnating or saturating paper with solutions of thermosetting resins as is known in the art. Such impregnated or saturated papers are commercially available. Briefly, these known procedures for producing resin-saturated laminating papers involve dipping or otherwise contacting paper or other fibrous material (e.g. woven and non-woven fabrics) with a coating composition which is typically a solvent solution of thermosetting resin and catalyst, plus other optional inert or active ingredients. The wet paper is then dried (e.g. oven dried) to remove any inert solvent without substantially curing the resin.

The resins which can be used in this invention are the thermosetting resins which can be hardened, set or cured at the temperatures and pressures herein contemplated for use. The selection of operable resins is within the skill of the art when aided by this disclosure, although all do not serve with equal efficiency. Thus, phenolic, melamine and polyester resins can be used. Mixtures of resins can be used. We have obtained best results using unsaturated polyester resins as the only or predominant resin. As is known in the art, unsaturated polyester resins are used in admixture with polymerizable monomers (e.g. styrene, diallyl phthalate, vinyl toluene, methyl methacrylate, etc). They can be cured with or without the aid of catalysts (e.g. benzoyl peroxide or cumene hydroperoxide) although such are normally used. For a more comprehensive discussion of unsaturated polyester resins, see the text "Polymers and Resins" by Brage Golding, copyright 1959 by D. Van Nostrand Company, Inc. Pages 303–314 are incorporated herein by reference for their disclosure of unsaturated polyester resins, polymerizable monomers, catalysts, etc.

We prefer to use unsaturated polyester resins which are chemically resistant (when cured). Desirably, the uncured resins (without dilution) will have a high viscosity (e.g. above 100,000 centipoise), or, more preferably, be solid so that saturated papers prepared therefrom will have little or no tackiness after inert solvents used during saturation are removed. Unsaturated resins prepared from maleic or fumaric acids with isophthalic acid and/or a bis-phenol are well suited for use in this invention. The more preferred resins will have a reactivity number (i.e. the sum of acid number and hydroxyl number) below 100, more usually, below 60 (e.g. 30–40). Typically, a slight excess (e.g. 2–10% excess) polyhydric alcohol will be used in preparing these resins.

Unsaturated polyester resins are ordinarily cured or hardened by reaction with copolymerizable monomers (e.g. styrene) in the presence of a catalyst. If a volatile monomer is used (e.g. styrene), it is possible to eliminate any need for an inert organic solvent. However, saturated or impregnated papers prepared using such volatile monomers should be used promptly or substantial amounts of monomer will be lost by evaporation from the surface of the impregnated paper (unless thickeners or the like are added, e.g. magnesium oxide). Further, such saturated papers tend to be tacky or sticky, making storage difficult. Consequently, it is desirable that less volatile monomers be used (e.g. diallyl phthalate), together with an inert organic solvent (e.g. acetone). In this way, the paper can still be impregnated or saturated and, after removal of the inert solvent, the paper will retain the copolymerizable monomer. Moreover, the resulting paper will tend to have less residual tack (e.g. only a slight tack to the fingers) and is more convenient to store (e.g. as by winding on rolls). The selection of an effective amount of monomer (based on polyester weight) is an act within the skill of the art when aided by this disclosure.

As previously indicated, the resins and copolymerizable monomer are generally used as solvent solutions (e.g. in inert organic solvents). Suitable solvents include acetone, methylene chloride, hydrocarbons, etc. These inert solvents should be removed (e.g. by baking) after saturating the paper without substantially curing or hardening the resin. By "substantially curing," we mean curing which has proceeded to the point at which the resin impregnated paper cannot be used to form a satisfactory laminate (e.g. poor resin flow during lamination or poor adhesion to the gypsum board). These coating compositions can contain catalysts, coloring agents, temporary blocking agents, foam inhibitors, flow control agents, stabilizers, fillers, etc.

Ordinarily, the coating compositions will be used to impregnate decorative papers rather than plain papers. For example, paper printed to resemble wood paneling can be used to create wood-like laminates. Although paper is the preferred base material for saturation, other fibrous materials in sheet form can be used, e.g. woven and non-woven fabrics. The *dry* uncured resin impregnated paper can be made with varying resin contents. To be effective, the dry saturated paper should contain at least 25 weight percent, preferably more than 50 weight percent of deposited solids (the solids are usually polyester resin, monomer and additives) based on the weight of the uncoated paper. When higher quality laminates are desired (e.g. for improved abrasion resistance), resin impregnated overlay sheets can be inserted in the laminating assembly shown in FIG. 1 between the impregnated decorative paper 3 and caul sheet 2 (or the release sheet, when such is used). The purpose of using impregnated overlay sheets is to provide a thicker, resin rich surface on the laminates, thereby making them tougher and more abrasion resistant. Such overlay sheets are commercially available and typically contain from 15–30% by weight of paper or fiber, with the balance to make 100% of deposited solids (primarily resin). For most purposes, the paper (or other fiber) and resin used in overlay sheets should be selected so that their refractive indices match on curing to thereby give a clear or transparent coating over the decorative paper below. Suitable base materials for use in making clear overlays are alpha cellulose, fiber glass, rayon and "Orlon" (a registered trademark).

Figure 2:
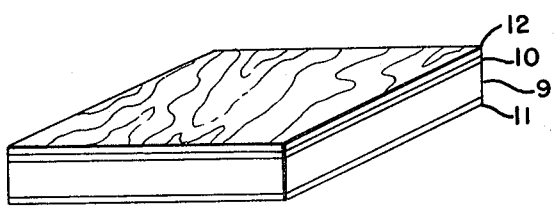
FIG. 2 is an isometric view of a laminated gypsum board prepared according to this invention.

Gypsum wallboard is commonly manufactured and sol in 4' x 8' sheets and (3/8"–5/8" thick) although other sizes are known. See FIG. 2. Both sides of gypsum wallboard 9 have adherent paper surfaces 10 and 11. Ordinarily, one of these paper surfaces 10 will be of better quality than the other. Sometimes, the "finished" side of the gypsum board will be highly calendered and/or contain small amounts of resins, etc. to give a smoother wall. However, the amount of resin, etc. used for this purpose is ordinarily quite small (e.g. less than 5 weight percent based on the weight of the paper surface). When these wallboards are used as supporting substrates for laminates made according to the present invention, the resin impregnated paper 12 will be firmly bonded to one of these paper surfaces 10, usually, the surface of best quality. If desired, the receiving paper surface on the gypsum board can be pre-coated with a resin-containing coating composition just prior to formation of the laminate assembly and lamination.

Gypsum board tends to absorb moisture during storage. In preparing the laminates of the present invention, it has been observed that retained water in the wallboard is converted to steam during lamination and sometimes causes the board to explode or blister when the non-laminated surface of the gypsum board is in immediate contact with a non-porous member such as an aluminum caul or press platen. This problem can be avoided by controlling the amount of moisture in the gypsum board, or more easily by simultaneously laminating two pieces of gypsum board back to back. In a back-to-back configuration, the steam can escape through and between the non-laminated paper surfaces of the gypsum boards without destroying the board itself. If desired, this release of pressure can be substantially further improved by inserting a porous pad (e.g. a 1/8" thick cotton asbestos pad) between the non-laminated paper surfaces of gypsum boards 4 and 5.

The laminated gypsum boards of this invention are not as strong as the well known high-pressure laminates of the melamine type when supported on, for example, plywood, but they are tough and easy to machine. The laminated gypsum board can be cut in the same manner as non-laminated gypsum board (e.g. scored and broken).

The present invention will be further understood by reference to the following specific examples which include a preferred embodiment. Unless otherwise indicated, all parts and percentages are by weight.

EXAMPLE 1

Preparation of impregnated paper

A coating composition suitable for use in this invention can be made as follows by known prior art techniques:

| Ingredient: | Parts |
|---|---|
| Solid unsaturated polyester resin (e.g. an isophthalic acid resin) | 83 |
| Copolymerizable monomer (e.g. di-allyl phthalate) | 17 |
| Inert organic solvent (e.g. acetone) | 50 |
| Catalyst (e.g. benzoyl peroxide) | (¹) |
| Other optional additives (e.g. hydroquinone | (²) |

¹ As needed, i.e. a catalytic amount (e.g. 2 parts).
² Usually less than 10.

Suitable resins, monomers, and catalysts include those previously described. Peroxide catalysts are usually employed to speed the cure during lamination. Suitable inert organic solvents include the various ketones, methylene chloride, acetone, etc. Additives used can include flow control agents or thickeners (e.g. magnesium silicates or silicon dioxide) which prevent excessive resin flow during lamination, and inhibitors to improve storage stability (e.g. hydroquinone).

A sheet of paper or other base material can then be passed through a dip tank (containing this coating composition) at a controlled rate to deposit the desired amount of coating composition on the paper. The paper is then passed through an oven (e.g. at 250° F.) to remove inert organic solvent without substantially curing the resin. After drying, the saturated or coated paper can be wound on rolls (using a slip sheet) and stored until needed.

Similar results can be obtained using other thermosetting resin systems capable of curing under the conditions of temperature and pressure herein contemplated. Likewise, similar results can be obtained using other base materials (e.g. rayon fabric).

EXAMPLES 2–4

Preparation of gypsum board laminates

A series of single-sheet laminates without overlay were prepared using ordinary commercially available 5/8" thick gypsum board and a polyester resin saturated paper.

These laminates were prepared one at a time in a single tier oil-heated press operating at a temperature of 280°–300° F. and a pressure of about 100–120 p.s.i.g. The laminates were prepared one at a time using an assembly made up of aluminum caul 2, impregnated paper 3, gypsum board 4 and a cotton asbestos pad (not shown). The latter served to prevent contact between gypsum board 4 and press platen 8 and permitted the escape of steam from the gypsum board.

The paper used was decorative alpha cellulose paper (commercially available) impregnated with an inert organic solvent solution of a solid (powdered) unsaturated polyester resin prepared from isophthalic acid, maleic acid and propylene glycol and having a reactivity number of less than 50, a peroxide catalyst and a copolymerizable monomer (di-allyl phthalate) to a 60% solids content (i.e. resin, monomer, catalyst and additives) based on the weight of the dry, resin-impregnated paper (i.e. 150% based on the weight of the uncoated paper). Decorative paper of this type (after impregnation) typically weighs 160 pounds per 3,000 square feet of paper (i.e., approximately 18 square feet of resin-impregnated paper per pound of such impregnated paper).

In Example 2, a decorative sheet simulating black-walnut was used in conjunction with a release paper (commercially available) adapted to impart a wood grain feel and a low gloss to the supported laminate. The resulting laminate was of good quality suitable for use in interior construction.

In Example 3, a decorative paper printed to resemble marble was used. An etched and anodized aluminum caul sheet was used to impart a low gloss to the supported laminate. The resulting laminate was of good quality and gave a simulated marble appearance.

In Example 4, a white decorative paper with gold flecks was used in conjunction with an aluminum caul having a rippled surface. The resulting laminate was of good quality, having a medium gloss and a slightly rippled surface.

Although these first three laminates were prepared using only one sheet of decorative resin-impregnated paper, as contrasted to conventional high-pressure laminates which frequently use 10–12 sheets of resin-impregnated paper, the abrasion resistance of such products (i.e. single sheet laminates prepared according to this invention) is approximately one-half of the abrasion resistance of Class I high-pressure melamines made with an overlay. However, when the laminates of the present invention are prepared using a clear resin-rich "Orlon" saturated overlay sheet in addition to the saturated decorative sheet, the abrasion resistance can be substantially increased beyond that of the Class I high-pressure melamines with overlay.

EXAMPLE 5

A series of paired laminates were prepared using the same conditions and cycle times as Examples 2–4, but using the two-laminate assembly as shown in FIG. 1.

All laminates were of good quality and there were no rejects because of steam blow-up.

In preparing some of these laminates, steam removal was aided by the insertion of a cotton-asbestos pad between gypsum boards 4 and 5.

By contrast, several laminates prepared singly from the same materials and under the same process conditions were visibly damaged by steam blow-up when the non-laminated side of gypsum board 4 was placed in immediate contact with a non-porous surface (i.e., an aluminum caul plate) during laminating.

Although the present invention has been described with a certain degree of particularity, it will be realized that numerous changes and modifications can be made by one skilled in the art. For example, the original manufacture of gypsum board can be altered by the substitution of a decorative paper for the non-decorative paper which is currently used to form the opposing surfaces of gypsum board. In this way, results similar to those obtained by the present invention can be obtained by simply saturating the decorative surface of the gypsum board with a resin solution and then subjecting the resin-impregnated gypsum board to the conditions of temperature and pressure indicated herein.

What is claimed is:

1. A laminated product comprising a substrate and a resin-impregnated paper or cloth sheet bonded to said substrate by the resin of said resin-impregnated paper or cloth and wherein the substrate is a gypsum board and the resin is an unsaturated resin having a reactivity number below 100 and prepared from maleic acid or fumaric acid with isophthalic acid or a bis-phenol and a polyhydric alcohol cured by reaction with a copolymerizable monomer and wherein the paper or cloth sheet contains more than 50% by weight resin solids based on the weight of the unimpregnated sheet.

2. A laminated product according to claim 1 wherein the reactivity number of the unsaturated resin is below 60.

3. A laminated product according to claim 1 wherein the copolymerizable monomer is styrene.

4. A laminated product according to claim 1 wherein the reactivity number of the unsaturated resin is between 30 and 40.

5. A laminated product according to claim 4 wherein the copolymerizable monomer is styrene.

References Cited

UNITED STATES PATENTS

| Patent No. | Date | Inventor | Class |
|---|---|---|---|
| 2,554,471 | 5/1951 | Patterson et al. | 161—233 X |
| 2,631,960 | 3/1953 | Dafter | 161—233 X |
| 3,049,458 | 8/1962 | Willard | 161—165 |
| 3,313,675 | 4/1967 | Petropoulos et al. | 161—205 X |
| 3,413,188 | 11/1968 | Allen | 161—233 X |

OTHER REFERENCES

Boenig, "Unsaturated Polyesters: Structure and Properties," 1964, pp. 100, 111, 130–134.

ROBERT F. BURNETT, Primary Examiner

J. C. GIL, Assistant Examiner

U.S. Cl. X.R.

161—232, 233, 270, 413